Jan. 11, 1955 L. G. MacKENZIE 2,699,332

MEANS FOR ACTUATING AN ENDLESS TAPE OR THE LIKE

Filed Nov. 13, 1951

2 Sheets-Sheet 1

INVENTOR.
LOUIS G. MACKENZIE
BY Forrest J. Lilly
Attorney

INVENTOR.
LOUIS G. MACKENZIE
BY Forrest J. Lilly
Attorney

United States Patent Office 2,699,332

Patented Jan. 11, 1955

2,699,332

MEANS FOR ACTUATING AN ENDLESS TAPE OR THE LIKE

Louis G. MacKenzie, Monrovia, Calif., assignor to Magna Electronics Co., Los Angeles, Calif., a corporation of California Application November 13, 1951, Serial No. 255,917

12 Claims. (Cl. 271—2.18)

This invention relates to means and methods for supporting and actuating an endless tape in the form of a spiral coil with a loop of the tape extending from the inner and outer turns of the coil to an operating zone, the purpose being to pass the full length of the tape repeatedly through the operating zone.

Both the physical character of the endless tape and the specific operation performed in the operating zone will depend upon the primary purpose served by the tape. If, for example, the purpose is to project a motion picture repeatedly, the tape will be in the form of an endless motion picture film and the operating zone will be provided by a motion picture projector. To give other examples, an endless tape having a suitable control pattern thereon, such as a pattern of perforations, may pass through an operating zone in which the pattern on the tape serves to control some means such as a musical instrument, a printing mechanism, a calculating mechanism, an electric sign, and the like.

In all such procedures the loop of the tape interconnecting the inner and outer turns of the spiral coil moves through the operating zone either steadily at a given constant rate of travel, or, in the case of motion picture film, intermittently at a given average rate of travel. A certain problem arises with respect to the turns of the spiral coil since the tape must travel at the given rate throughout its length, and therefore the different turns of the spiral coil must move at different angular velocities in accord with the different diameters of the turns. Thus, in terms of rotation about the axis of the coil, each successive turn from the largest outer turn to the smallest inner turn must rotate at a slightly increased rate to maintain the same given rate of linear travel throughout the length of the tape and, therefore, the successive turns must continually slip relative to each other. The problem is to actuate the coil and the tape loop that extends from the coil in such a manner as to promote relative circumferential movement among the coils and a related problem is to maintain a given loop configuration.

In practice the test for a satisfactory solution to the problem is in the tension prevailing in the tape loop. The tape is driven linearly in a positive manner at some point on the tape loop in or near the operating zone and some degree of tension must be maintained in the two legs of the loop that extend from the operating zone to the inner and outer turns, respectively, of the spiral coil. If either of these legs of the loop becomes too slack the tape will kink and snarl. On the other hand, too much tension will cause the tape to break. The problem may be restated, then, as that of so supporting and so actuating the helical coil in conjunction with the driving means at the tape loop as to maintain an effective but not excessive tension in both the leg of the loop fed from the coil to the operating zone, and the leg of the loop fed back to the coil from the operating zone.

The utility of the invention may be appreciated from its successful application to the difficult problem of handling exceedingly thin ribbon of cellulose acetate impregnated with ferromagnetic particles for use in magnetic sound recording. Such an application of the invention in the sound recording field will be described herein by way of example and disclosure as well as to afford guidance to those skilled in the art who may have occasion to apply the same principles for other specific purposes.

One object of this specific application of the invention, as may be understood from the foregoing, is to so handle the helical coil of the sound tape as to provide for continual slippage among the coil turns and at the same time to maintain continuously a desired degree of tension in the tape loop. More specifically stated, the object with reference to tension is to so support and actuate the coil as to cause the coil to resist to a desired limited degree the pull of tape from the coil by the tape driving means and at the same time to cause the coil to exert pull to a desired limited degree on the tape returning from the driving means.

As will be explained, this object is attained by employing a suitably surfaced turntable with a central circular tape guide or guide core and rotating the turntable at a particular speed or within a particular range of speeds relative to the linear speed imparted to the tape loop by the tape driver. At the selected speed or range of speeds the inner area of the turntable exerts frictionally retarding force on the tape wrapped around the guide core and thereby causes the desired relatively light resistance to the pull on the tape exerted by the tape driving means. At the same time, by virtue of the selected speed or range of speeds, the outer area of the turntable exerts frictional accelerating force on the outer turn of the helical coil thereby creating a light pull on the tape moving back to the coil from the driving means.

A feature of the preferred practice of the invention is the further provision of means to act on the helical coil in such manner as to promote continual adjustment of the coil on the turntable. Such adjustment requires progressive slippage among the turns of the coil and may be promoted, for example, by repeatedly disturbing the face-to-face contacts among the turns of the coil. In the preferred practice of the invention protuberances on the surface of the turntable are provided for this purpose.

Another object of the preferred practice of the invention is to provide a means and method for continually treating the surface of the endless coil to facilitate the desired slippage among the coil turns. Among the causes for inadequate slippage among the turns of the coil are the intermeshing of minute surface irregularities on contiguous faces of the tape, the friction between contiguous tape faces, and electrostatic attraction. Preferably the surface of the tape is treated to minimize as many of these causes as possible. A feature of the preferred practice of my invention is the use of graphite to minimize all three of the causes. Preferably one face of the continuous tape is moved across a graphite surface that reduces the surface irregularities of the tape not only by mechanically reducing the irregularities but also by depositing graphite in the surface depressions of the tape. The conductivity of the applied graphite serves to dissipate electrostatic charges on the tape and, finally, the lubricant properties of the graphite minimize face-to-face friction among the turns of the coil.

A further specific object of the preferred practice of the invention is to provide sound tape recording or reproduction units in the form of flat disk-shaped cartridges or units with magnetic tape recordings therein, which cartridges are adapted for interchangeable use on suitable play-back devices. In this way the invention combines all of the advantages of magnetic tape recording with the convenience and other advantages of interchangeable disk-shaped cartridges. A further advantage is complete protection for the enclosed helical coil of the tape.

The above and other objects and advantages of the invention will be understood from the following detailed description taken with the accompanying drawings.

In the drawings, which are to be regarded as merely illustrative:

Figures 1, 2, 3, 4, 5, 6:
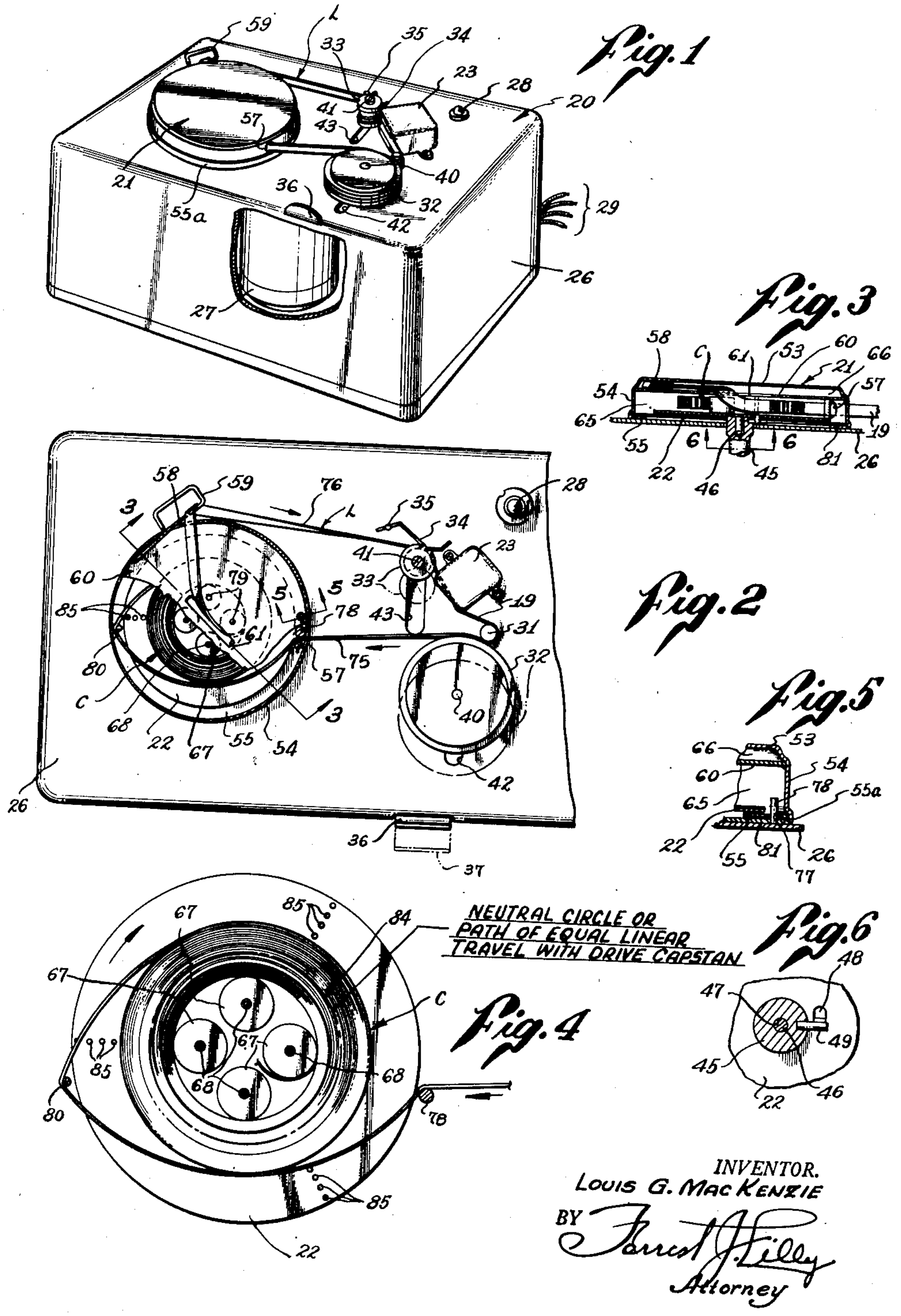
Figure 1 is a perspective view of a recorder or playback device with a disk-shaped cartridge or unit containing a roll of sound tape, mounted operatively thereon to illustrate one practice of the invention, a portion of the device being broken away to reveal an actuating motor therein.
Figure 2 is a plan view of an enlarged scale of the major portion of the arrangement shown in Figure 1 with upper walls of the cartridge broken away to reveal the disposition of the endless tape therein.
Figure 3 is an axial section through the cartridge taken as indicated by the line 3—3 of Figure 2.
Figure 4 is an enlarged plan view of the cartridge with the upper walls and the circumferential walls of the cartridge removed to show how the helical coil rests on the turntable in the cartridge.
Figure 5 is a fragmentary section on an enlarged scale taken as indicated by the line 5—5 in Figure 2.
Figure 6 is a fragmentary section taken as indicated by the line 6—6 of Figure 3.

Figures 1 and 2 show a device generally designated 20 which may be either a recording device or a play-back device. For the purpose of disclosure it will be described as a player or play-back device. Figures 1 and 2 also show a disk-shaped cartridge, or unit, generally designated 21, containing a roll of sound tape, the cartridge being shown in operating position on the play-back device. The bottom of the cartridge 21 is formed in part by a turntable 22, best shown in Figures 2 and 3 which supports a coil C of the endless cellulose acetate sound tape. Extending laterally from the cartridge 21 is a loop L of the endless tape for cooperation with reproduction head 23.

The particular player 20 shown in the drawings has a box-like casing 26 which encloses suitable mechanism actuated by a motor 27. The player has suitable manually operable controls including at least one rotary knob 28 and is provided with suitable wires 29 which may include wires for connection to a loudspeaker (not shown), as well as wires for energizing the motor 27.

The reproduction head 23 provides the operating zone through which the endless tape is to be passed and the player 20 drives and guides the tape through this zone. For this purpose the player includes a driving means in the form of the usual capstan 31 and a cooperating pressure roll 32 which holds the traveling tape against the periphery of the capstan. On the opposite side of the reproduction head 23 is a suitable non-rotating guide member 33 and a cooperating light pressure finger 34 mounted on an upright spindle 35. Suitable yielding means concealed in the casing 26 acting on the spindle 35 urges the pressure finger 34 towards the guide member 33 to press the traveling tape 19 against the guide member.

In the particular arrangement shown, both the pressure roll 32 and the guide member 33 are adapted for retraction laterally away from the path of the traveling tape. Such retraction is accomplished by pulling a small handle 36 outward from its normal position to the dotted position indicated at 37 in Figure 2. The handle 36 is the upturned end of a horizontal slide in the player casing that is urged towards its normal position by suitable spring means concealed in the casing 26. Mounted on this slide is an axle pin 40 for the pressure roll 32 and a pin or screw 41 carrying the guide member 33, these two members extending upwardly through slots 42 and 43, respectively, in the top of the casing 26.

The motor 27 drives both the capstan 31 and an upright shaft 45 that is adapted to drive the turntable 22 in the bottom of the cartridge 21. As shown in Figures 3 and 6, the turntable 22 has an axial pin 46 that removably seats in a bore 47 in the end of the shaft 45 and the underside of the turntable is provided with a suitable projection or lug 48 positioned for engagement by a radial pin 49 on the shaft. The abutment of the radial pin 49 against the lug 48 causes the turntable 22 to rotate with the shaft 45.

Figure 7:
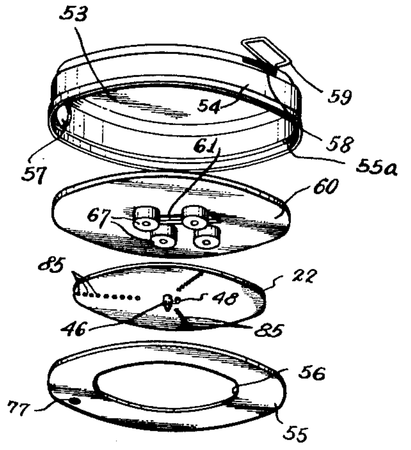
Figure 7 is an exploded view of the structure of the cartridge without the helical coil.

The preferred construction for the cartridge 21 may be understood by referring to Figures 2, 3 and 7. In this form the cartridge 21 has a thin-walled shell comprising a top wall 53, a circumferential wall 54 and a bottom wall

55. The bottom wall 55 has a circular opening 56 in its center large enough to clear the previously mentioned shaft 45 and axial pin 46, but small enough to confine the previously mentioned turntable 22. The turntable closes the opening 56 when the cartridge is apart from the player 20, but when the cartridge 21 is mounted on the player, shaft 45 holds the turntable slightly above the bottom wall 55, as indicated in Figure 5, to permit free rotation of the turntable without frictional contact with the bottom wall.

The shell of the cartridge 21 has an inlet opening 57 for the tape in the circumferential wall 54 and has an outlet opening for the tape in the form of a horizontal slot 58 at the upper edge of the circumferential wall and is provided with an exterior tape guide near the slot, the tape guide being shown in the form of a rectangular wire loop 59. Mounted inside the shell of the cartridge is a transverse plate or partition 60 having a central diametrically alined slot 61, this partition being positioned in the upper part of the shell to divide the interior of the cartridge into a lower chamber 65 (Figures 3 and 5) in communication with the tape inlet opening 57, and a shallow upper space 66 in communication with the tape outlet slot 58.

An inner circular tape guide or guide core to fit into the innermost turn of the helical tape coil C may be provided in any suitable manner. In the preferred embodiment of the invention the inner tape guide comprises a plurality of small rollers 67, there being a pair of the rollers on each side of the diametric slot 61. In this particular construction each of the rollers rests flat on the turntable 22 but is rotatably held in position by an axle pin 68 that extends upward from the roller into a corresponding hole 79 in the partition 60.

Figure 8:
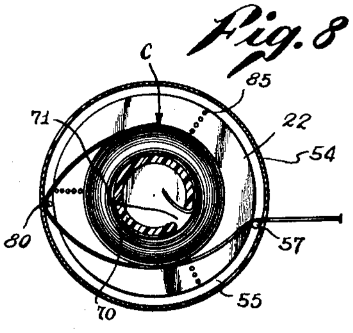
Figure 8 is a horizontal sectional view of a modified form of the recorder or playback device.

An alternate form of inner guide core may comprise a smooth cylindrical wall extending downward from the partition 60. Figure 8, by way of example, shows such an arcuate wall 70, the opposite ends of which form an opening 71 through which the tape may be led from the innermost turn of the helical coil C.

As best shown in Figure 2, one leg 75 of the tape loop L enters the inlet opening 57 of the cartridge to feed the helical coil C at its outermost turn. At the same time the tape of the innermost turn of the coil after passing around the four rollers 67 of the inner guide core, wraps partially around the fourth roller and then passes upward through the diametrical slot 61 in the partition 60 into the shallow upper space 66. The outgoing tape then moves across the upper surface of the partition 60 and out through the slot 58 for change in direction around the wire of the loop 59 to become the second leg 76 of the loop L.

Preferably, suitable means is provided to fix the rotary position of the shell of the cartridge 21 when the cartridge is placed on the player 20. For this purpose the cartridge may have a downwardly extending peripheral flange 55a while bottom wall 55 may be provided with a small hole 77 to receive an anchoring pin or stud 78 mounted on the upper surface of the player, as best shown in Figure 5. The purpose of the peripheral flange 55a is to fit around and be engaged by ring-shaped plate 81 fixedly mounted on the top of the player 20 concentrically of the shaft 45.

Preferably, but not necessarily, suitable guide pins for the incoming tape are provided inside the cartridge 21. Thus Figure 2 shows a pair of spaced guide pins 78 mounted between the bottom wall 55 and the partition 60 on opposite sides of the inlet opening 57 and again on the opposite side of the shell shows a similar single guide pin 80.

To place the cartridge 21 on the player 20, the axial pin 46 of the turntable 22 is first seated in the bore 47 at the upper end of the shaft 45 and then the shell of the cartridge is manipulated to cause the stud 78 on top of the player to enter the hole 77 in the bottom wall 55. The cartridge is then released to rest on the player with the cartridge rim 55a surrounding and engaging the ring-shaped plate 81. With the handle 36 pulled outward to the dotted position 37 of Figure 2, it is a simple matter to place the loop L of the endless tape in proper position around the guide member 33 and the capstan 31. Release of the handle 36 to return to its normal position brings the pressure roll 32 against the tape on the capstan 31 and also causes the guide member 33 to shift to its normal position with the pressure finger 34 lightly holding the tape against the guide member. As will be explained, normal operation inherently places both legs 75 and 76 of the tape loop L under a certain degree of tension so that any slackness in the tape loop when the cartridge is first mounted on the player quickly disappears.

The present invention is primarily concerned with the behavior of the helical coil on the turntable 22 and is directed to the problem of so operating and/or so modifying the described basic arrangement as to secure the desired control over the coil behavior. As heretofore indicated, the requisites are slippage to the desired degree among the turns of the coil and tension to the desired degree in both the in-going leg 75 and the out-going leg 76 of the tape loop.

The behavior or action of the tape coil on the turntable is determined by a complex set of factors including, among others, friction between the coil and the turntable surface on which it rests, the character of the tape surfaces in face-to-face contact among the turns of the coil, electrostatic adhesion among the turns, the tension in both legs of the tape loop with special reference to the in-going leg 75, and the angular velocity of the turntable.

It has been found that the problem of controlling the action of the coil on the turntable may be solved largely, and in some instances entirely, by providing a turntable surface that will have a relatively light frictional effect on the turns of the coil and by the further provision of rotating the turntable at a certain rate or within a certain range of angular velocities relative to the linear speed imparted to the tape by the driving capstan 31.

It can be readily understood that the speed of rotation of the turntable may be matched with the approximate linear speed of any one turn of the helical coil but will then differ from the rate of travel of all the other turns of the coil. Thus, if the rate of movement of the surface of the turntable is equal to the rate of movement of the tape at the innermost turn of the helical coil, the surface of the turntable will move faster than all the remaining turns of the coil, and, conversely, if the surface speed of the turntable matches the outermost turn of the coil the surface of the turntable will move slower than the rest of the turns of the coil.

For convenience, the concentric circle of points on the turntable that travels at the same speed as the linear speed of the tape will be termed the neutral circle. I have discovered that the speed of the turntable should be such that the diameter of the neutral circle is greater than the diameter of the innermost turn of the helical coil but less than the diameter of the outermost turn of the coil and that optimum results with the present type of sound tape are obtained by operating the turntable at a rate to place the diameter of the neutral circle substantially closer to the diameter of the innermost turn of the coil. Such a neutral circle is indicated by dash-dot lines at 84 in Figure 4.

At the neutral circle 84 the frictional effect of the rotating turntable surface on the traveling tape is substantially zero, but for each successive turn of the coil of lesser diameter than the neutral circle, the surface of the turntable travels at a lower speed than the tape end, on the other hand, the speed of the surface of the turntable is progressively greater than the linear speed of the tape in each successive turn of larger diameter than the neutral circle. Thus the surface of the turntable tends to retard the inner turns of the coil frictionally and at the same time tends to accelerate the outer turns frictionally. The retardation effect on the inner turns causes the inner turns to tighten slightly around the inner guide core comprising the four rollers 67. This retardation or tightening effect on the inner turns of the coil opposes the pull of the driving capstan 31 and thus creates the desired degree of tension in the out-going leg 76 of the tape loop. On the other hand, the tendency of the rotating surface of the turntable to accelerate the outer turns of the coil not only tends to make the outer turns compact but also creates sufficient pull on the tape from the capstan 31 to place the in-going leg 75 of the tape loop under the desired degree of tension.

It can be seen that there is what may be termed a retarding frictional gradient extending radially inward from the neutral circle and a similar accelerating frictional gradient extending radially outward from the neutral circle. It is contemplated that the character of the turntable surface will be such that these two gradients will be relatively gradual and will have maximum values at the inner and outer turns respectively just sufficient to maintain the desired tension in the two legs of the tape loop. For handling cellulose acetate sound tape the turntable surface should be relatively smooth. Polished or semi-polished metal has been found satisfactory.

When the turntable is rotated at the proper angular speed the helical coil forms a characteristic pattern with an outer zone of compact turns and an inner zone of compact turns, with these two zones separated by an intermediate zone of loose turns as may be seen in cross-section in Figure 3. If a coil selected at random is placed on such a turntable and the speed is regulated solely by trial and error until the coil takes the characteristic pattern described, it will be found that the neutral circle lies in the intermediate zone of loose turns. An important advantage of making the above-mentioned friction gradients gradual is the consequence widening of the intermediate loose zone.

Rotating the turntable at such a speed relative to the rate of linear travel imparted to the tape by the capstan 31 is not always sufficient, alone, to cause the tape coil to behave in the desired manner. Often further steps must be taken to minimize a certain tendency for the coil to act in an unstable manner. It has been found that the coil is usually stable and otherwise satisfactory in its action when the various factors involved cause the coil to take a substantially circular configuration concentric to the axis of rotation of the turntable.

Apparently the tension in the in-going leg 75 of the tape loop tends to distort the coil to elliptical configuration with resulting increased friction among the turns of the coil at the two ends of the major axis of the ellipse. Under such conditions the coil tends to become unstable as evidenced by pronounced oscillation on the turntable and the tension in one or both of the legs of the tape loop may approach the breaking point.

In some instances a satisfactory solution to the above problem is to take some appropriate step to reduce the friction among the turns of the coil. If the turns of the coil slide freely past each other appreciable increase in face-to-face pressure among the turns caused by elliptical distortion of the coil may be tolerated. In this regard, a feature of the preferred practice of my invention is the continual treatment of the surface of the tape with a suitable material to minimize adhesion among the turns of the coil. For this purpose the traveling tape is brought into contact with a graphite surface in some suitable manner. In the described embodiment of the invention it is necessary merely to make the guide pin 78 of graphite or of material including graphite as an ingredient. Graphite in a clay-binder such as the "lead" in a lead pencil serves the purpose well and a guide post of this composition has a long service. The effect of the graphite has been explained heretofore.

When necessary, a direct attack on the tendency of the coil to become elliptical may be made by removing, nullifying or modifying the distorting forces. In some instances the addition of the guide pin 80 has the desired corrective effect, apparently, in part because it creates a run of tape between the guide pin 80 and the graphite pin 78, which run presses against the periphery of the coil as may be seen in Figure 4.

In many instances a more effective step to correct the tendency of the coil to become elliptical and unstable on the turntable and too taut in the loop is to provide suitable protuberances on the surface of the turntable for contact with the turns of the coil. In the preferred practice of the invention, the turntable is a disk of thin polished metal and the protuberances are formed merely by raising or off-setting the metal to form a plurality of small bosses. Such bosses may be formed, for example, by using a suitable pointed punch against the underside of the metal.

Figure 9:
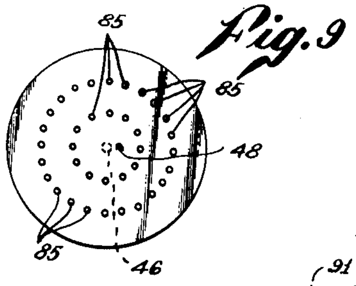
Figures 9 and 10 are plan views indicating the construction of modified forms of the turntable.
Figure 10:
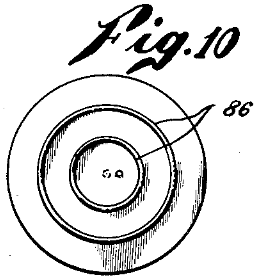

As shown in Figures 4 and 7, the plurality of bosses 85 may be arranged in three radial rows. The bosses may be arranged in other patterns, for example, in a pattern of concentric circles as shown in Figure 9. The protuberances may also be in the form of curved ribs on the upper surface of the turntable, for example, in the form of two circular ribs 86 as shown in Figure 10.

In each instance the protuberances, whether in the form of a boss or a rib, or some other form, move in a concentric path and therefore cut across the eccentric or helical turns of the coil and thus tend continuously to cause relative lateral movement among the turns. As a result the turns are continually disturbed to sufficient extent to cause the turns to continually adjust relative to each other by slippage.

Figures 11, 12, 13:
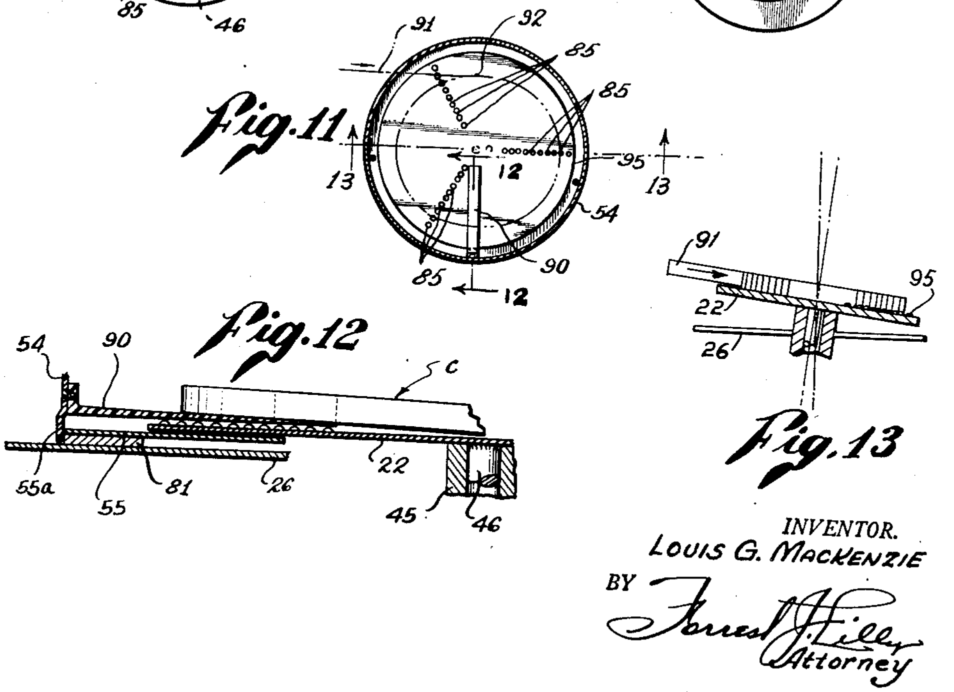
Figure 11 is a horizontal section of a cartridge showing how a flexible blade may be incorporated therein for a further modification of the invention.
Figure 12 is a fragmentary section on an enlarged scale taken as indicated by the line 12—12 of Figure 11; and, Figure 13 is a cross sectional view taken as indicated by the line 13—13 of Figure 11.

A further expedient to correct elliptical distortion that has been found to be satisfactory, especially with relatively large coils of sound tape, is to add a blade or metal strip to support part of the coil above the surface of the turntable. Figures 11 and 12 show such a blade 90 extending radially inward across the top of the turntable, the outer end of the blade being anchored on the peripheral wall 54 of the reproduction unit. In this practice of the invention the ingoing leg of the tape loop indicated by the dotted line 91 in Figure 11 reaches the coil tangentially at the point 92 and the blade 90 is positioned substantially diametrically opposite from the point 92. The effect of the blade 90, of course, is to remove the frictional contact of the turntable from approximately half the undersurface of the coil and to substitute retarding frictional contact across the surface of the blade. It has been found that such an interposition of a radial blade will usually cause a coil to change from a troublesome elliptical configuration to a more circular trouble-free configuration. The blade 90 may be of relatively rigid material spaced above the paths of movement of the bosses 85 or may be of flexible material and positioned low enough to be displaced upward by each row of the bosses. In the latter arrangement the blade continually vibrates the coil to facilitate slippage of the coil turns.

It has been found that the tendency of the coil on the turntable to become elliptical and unstable may also be reduced to satisfactory degree simply by tilting the turntable axis so that the surface of the turntable is inclined downwardly in the direction of travel of the in-going leg of the tape loop. Thus, with reference to Figures 11 and 13, instead of adding the blade 90, the turntable may be inclined slightly to place the lowest point on the diameter that is parallel with the in-going leg 91, in other words, to place the lowest point at the peripheral point 95 in Figures 11 and 13. The inclination, which is not critical, may be for example at a drop of 1″ for 12″ of diameter. Thus if the diameter of the turntable at the point 95 is 6″ the point 95 may be one-half inch below the opposite point on the same diameter. The proper angle of inclination may be readily found by a simple experiment, and, of course, the shaft 45 for driving the turntable as well as the surrounding top surface of the player 20 will be inclined accordingly.

While the foregoing disclosure is directed to the problem of handling a thin flexible sound tape of cellulose acetate it is obvious that the same principles may be applied to the handling of other kinds of tape. It will also be apparent to those skilled in the art that various changes, substitutions and other departures from my disclosure may be made within the spirit and scope of the appended claims.

Having described my invention, I claim:

1. In an apparatus of the character described for running an endless flexible tape through an operating zone with the tape forming a spiral coil and with a loop of the tape extending through said operating zone from the inner and outer turns of the coil, the combination of: a turntable to support said spiral coil, said turntable having separate protuberances spaced at different radial distances on its supporting face; means to engage said loop to pull the tape from the coil for movement through said operating zone; and means to rotate said turntable to feed the tape from said coil to said engaging means.

2. An apparatus as set forth in claim 1 in which said protuberances are in the form of a plurality of bosses.

3. An apparatus as set forth in claim 1 in which said protuberances are in the form of curved ribs.

4. In an apparatus of the character described for running an endless flexible tape through an operating zone with the tape forming a spiral coil and with a loop of the tape extending through said operating zone from the inner and outer turns of the coil, the combination of: a turntable to support said coil; means to engage said loop to pull the tape from the coil and to feed the tape back to the coil, the axis of said turntable being inclined so that the surface of the turntable is inclined downwardly in the direction of travel of the tape fed back to the coil; and means to rotate said turntable in the direction to feed the tape to said engaging means.

5. An apparatus as set forth in claim 4 in which said turntable has separate protuberances spaced at different radial distances on its supporting face.

6. In an apparatus of the character described for running an endless flexible tape through an operating zone with the tape forming a spiral coil and with a loop of the tape extending through said operating zone from the inner and outer turns of the coil, the combination of: a turntable to support said spiral coil; a guide positioned in the region of the axis of the turntable to be embraced by the inner turn of the coil; means to engage said tape at said loop to pull the tape from the inner turn of the coil to pass the outer turn of the coil at a given linear speed; and means to rotate said turntable to match said linear speed at a concentric circle on the turntable larger than the cross dimension of said guide, but less than the diameter of the outer turn of the coil whereby the turntable frictionally opposes linear movement of the tape in the inner turns of the coil and frictionally tends to increase the linear speed of the tape in the outer turns of the coil, thereby forming three zones in the coil, namely, an inner zone of compact turns around said guide where the turntable frictionally opposes movement of the tape to create tension in one leg of said loop, an intermediate zone of loose turns in the region of said circle, and an outer circumferential zone of compact turns where the turntable tends to frictionally drive the tape faster than said given linear speed to create tension in the other leg of the loop, said turntable including separate protuberances spaced at different radial distances on the supporting face of said turntable.

7. An apparatus as set forth in claim 6 in which the normal to the supporting surface of said turntable and the plane of the turntable are inclined away from said engaging means.

8. In an apparatus for running an endless flexible tape through an operating zone with the tape forming a spiral coil and with a loop of the tape extending through said operating zone and including outgoing and ingoing legs forming part of the inner and outer turns of the coil respectively, the combination of: a turntable to support said spiral coil; engaging means to engage the outgoing leg of said tape loop to pull the tape from the inner turn of said coil to pass to the outer turn of said coil for movement through said operating zone; means to rotate said turntable to feed the tape to said engaging means; first guide means positioned adjacent one side of said coil adapted to guide said ingoing leg from said engaging means and second guide means positioned substantially on the opposite side of said coil from said first guide means and adapted to guide the ingoing leg of said tape loop onto said coil whereby said ingoing leg is tangent to said coil at two points substantially opposite each other.

9. The combination set forth in claim 8, in which one of said guide means includes a bearing surface of graphite against which said ingoing leg of tape bears.

10. In an apparatus for running an endless flexible tape through an operating zone with the tape forming a spiral coil and with a loop of the tape extending through said operating zone and including outgoing and ingoing legs forming part of the inner and outer turns of the coil respectively, the combination of: a turntable to support said spiral coil; means to engage the outgoing leg of said tape loop to pull the tape from the inner turn of said coil to pass to the outer turn of said coil for movement through said operating zone; means to rotate said turntable to feed the tape to said engaging means; and a stationary radially directed blade adjacent the surface of said turntable and positioned to lift that side of said spiral substantially opposite the point of tangency of the incoming leg to said coil, out of contact with the turntable.

11. In an apparatus for running an endless flexible tape through an operating zone with the tape forming a spiral coil and with a loop of the tape extending through said operating zone and including outgoing and ingoing legs forming part of the inner and outer turns of the coil respectively, the combination of: a turntable to support said spiral coil; engaging means positioned at one side of said coil to engage said tape loop to pull the tape from the inner turn of said coil to pass to the outer turn of said coil for movement through said operating zone; means to rotate said turntable to feed the tape to said engaging means; and a guide means positioned at a side of said coil substantially opposite to said one side at which said engaging means is positioned, to guide the ingoing leg of said tape loop onto said coil whereby said ingoing leg is tangent to said coil at two points substantially opposite each other.

12. The subject matter of claim 4, including also a graphite bearing surface for the tape.

References Cited in the file of this patent

UNITED STATES PATENTS

| | | |
|---|---|---|
| 2,238,719 | Tartas | Apr. 15, 1941 |
| 2,285,070 | Weber | June 2, 1942 |
| 2,398,639 | Heyer | Apr. 16, 1946 |
| 2,426,838 | Miller | Sept. 2, 1947 |